June 14, 1955 — R. E. MANLEY ET AL — 2,710,693
CONTINUOUS FILTER DRUM CONSTRUCTION
Filed April 22, 1952 — 2 Sheets-Sheet 1

INVENTORS
ROBERT E. MANLEY
HARRY R. ROBINSON
BY
ATTORNEY

INVENTOR.
ROBERT E. MANLEY
HARRY R. ROBINSON
BY
ATTORNEY

United States Patent Office 2,710,693
Patented June 14, 1955

2,710,693

CONTINUOUS FILTER DRUM CONSTRUCTION

Robert E. Manley, Yonkers, N. Y., and Harry R. Robinson, Port Arthur, Tex., assignors to The Texas Company, New York, N. Y., a corporation of Delaware Application April 22, 1952, Serial No. 283,564

8 Claims. (Cl. 210—202)

The present invention relates to continuous drum filters and particularly to the construction and arrangement of the filter cloth, blanket or filter medium upon which the solids separate from the filtrate.

In accordance with the present invention, the filter cloth or blanket embraces the periphery of a number of filter sections and is attached thereto through the agency of a plurality of flaps, bands or aprons of fabric or other flexible sheet material secured to the inner surface of the filter cloth along one marginal edge and engaged by suitable gripping means disposed upon the periphery of the filter drum. More specifically, the aprons or bands may be engaged with the division strips on the drum periphery in any suitable manner to hold the filter cloth in position. For example, the longitudinally extending division strips may be provided with caulking grooves or other attachment means to engage the flaps. Therefore, the flaps are preferably disposed along the filter cloth in juxtaposition to said division strips.

By this means, a unitary filter cloth may embrace a substantial portion of the drum, as for example, the entire peripheral surface, or a plurality of filter sections, without being, per se, specifically clamped or materially distorted by mechanical gripping means.

Therefore, the present invention avoids the strain, distortion, and abrasion of the filter element or cloth which is usually encountered when the edges of the cloth are caulked in position across a filter section in accordance with current practice. In such an arrangement the acute deformation of the filter cloth at the caulking groove and the localized tensioning and abrasion at this region seriously strains the fabric and, moreover, excludes all possibility of employing metal, glass, plastic, and other useful filtration media which are inapplicable to such treatment.

In order to illustrate the present invention in greater detail, reference is made to the figures of the attached drawing wherein.

Figure 1:
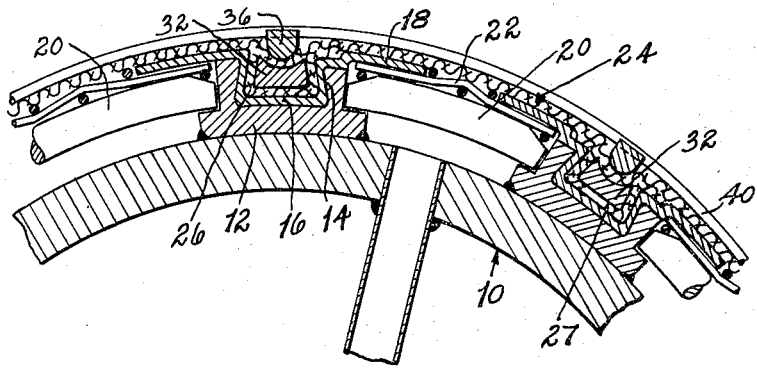
Figure 1 is a fragmentary cross sectional view drawn to enlarged scale and with shortened radius to facilitate illustration of the construction.

The filter drum 10, indicated in the drawings, is divided into sections by a plurality of longitudinally extending division strips 12 secured in place by welding, as indicated, or any other suitable means. Each division strip 12 is provided with a continuous undercut or dovetail groove 14 which, in the present embodiment, receives a sheet liner 16, the marginal flanges 18 of which extend laterally beyond the longitudinal edges of the division strip and overlie the edges of the filter cloth supports.

The filter cloth supporting structure intermediate of the division strips comprises supporting members 20 which may be a relatively coarse mesh of heavy wire screening which in turn supports a somewhat finer mesh screen or wire 22, e. g. of the order of 7 x 7 mesh. As above indicated, the flanges 18 of the plate 16 protect the filter cloth from projecting wires.

Figure 3:
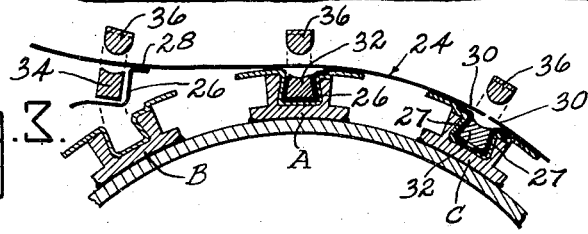
Figure 3 is a diagrammatic cross sectional view indicating the steps by which the filter cloth is applied to the drum.
Figure 4:
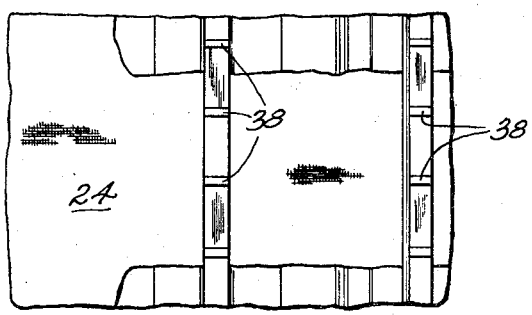
Figure 4 is a plan view similar to Figure 2 illustrating an intermediate stage of assembly.
Figure 5:
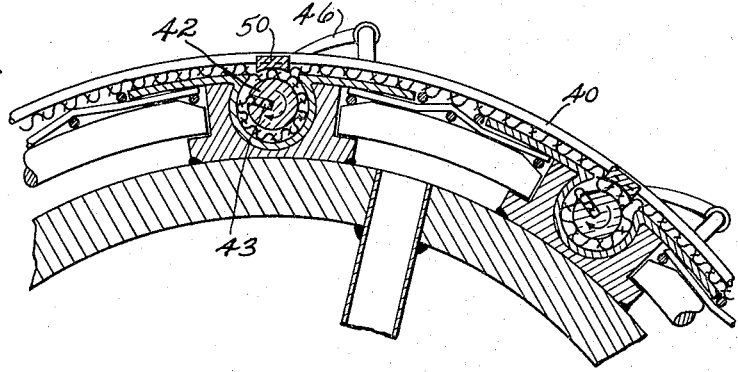
Figure 5 is a fragmentary cross sectional view similar to Figure 1 showing a somewhat modified embodiment.
Figure 6:
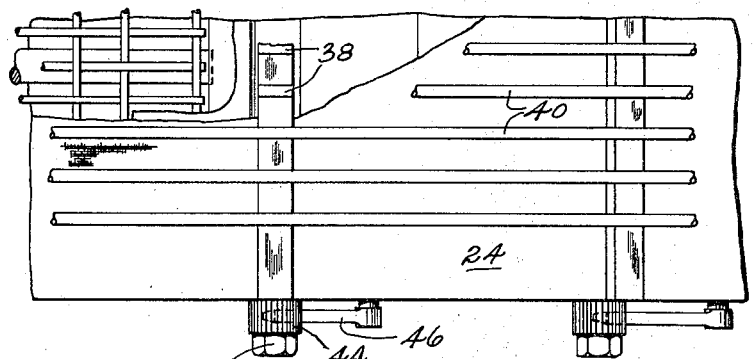
Figure 6 is a plan view of the embodiment of Figure 5.
Figure 7:
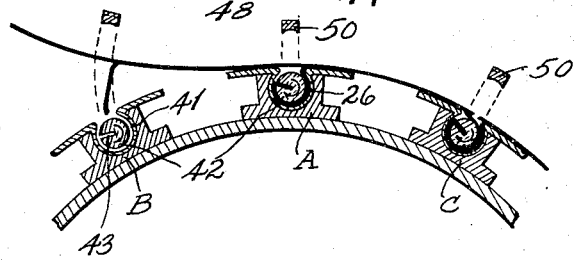
Figure 7 is a diagrammatic illustration illustrating the steps of applying the filter cloth in the embodiment of Figures 5 and 6.
Figure 8:
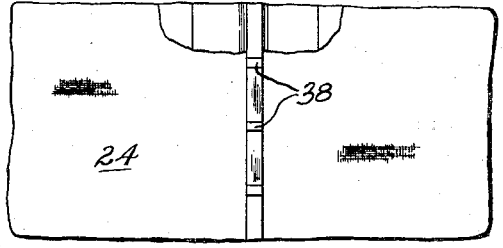
Figure 8 is a plan view corresponding to Figures 5 through 7 indicating an intermediate stage of assembly.

The filter cloth comprises a sheet of fabric 24 extending about the entire exterior surface of the filter drum and provided on its inner surface with flexible fabric extensions, appendages or flaps 26, shown more clearly in Figures 1 and 3. The flaps 26 are sewed or otherwise fixed, as by adhesive, plastic fusion, etc., to the inner surface of the filter cloth along a longitudinal or axial line of attachment as at 28 which is located adjacent one longitudinal margin thereof. Therefore, the major portion of each appended strip is free and constitutes a flexible apron or band with a free extremity or margin. Advantageously, the peripheral extremities 30 of the filter cloth 28 are also provided with fabric band appendages 27 as shown in Figure 3 to avoid damage to the filter cloth in such areas.

As also indicated in Figures 1 and 3, the flaps 26 are located in juxtaposition to the dovetail grooves 14 and are fixedly held therein by caulking with lead or other sufficiently firm, malleable material indicated by the reference numeral 32.

In the process of assembly, as indicated by Figure 3, the division strip designated by the letter A receives the respective flap 26 which is disposed against the surface of the dovetailed recess as shown. A strip of the caulking material 34 is inserted and driven into position to fill the interior space as at 32, and firmly grip the respective flap 26. The main body of the filter cloth is then disposed across the surface of the division strip A and attachment at division strip B is undertaken. At division strip B, the filter blanket is lifted or thrown back to facilitate access to the groove therein and permit insertion of the respective attaching flap 26 and application of the malleable caulking strip as before.

The caulking strip in position preparatory to insertion in the groove is indicated by the reference numeral 34. The flap 26 and caulking strip 34 are inserted and the latter is hammered or compressed to conform with the interior configuration of the groove. Thereafter, the filter cloth is drawn across division strip B and the remaining aprons 26 attached successively in the manner above indicated. Attachment of the peripheral extremities of the filter cloth, as indicated at division strip C, is preferably reserved until last, the attachment bands 27 being received by the same groove and simultaneously affixed in place as indicated.

Figure 2:
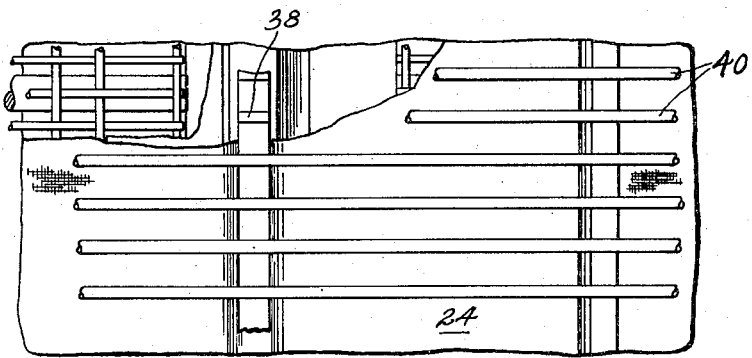
Figure 2 is a plan view of the parts shown in Figure 1 with certain portions broken away.

From the standpoint of holding the filter cloth down and protecting damage by the doctor blade, an outer protective drum winding is advantageously provided. To this end spacing rods 36 extend longitudinally of the drum over each caulking groove and are provided with circumferentially extending slots 38 to receive drum winding 40 (see Figures 1 and 2).

The spacing rods preferably have convex lower surfaces mating with the recess or groove which usually exists in the caulking 32, and the caulking is driven into place with a convexly faced tool.

In any event, the spacing rods overlie, that is, they are disposed radially outwardly or exteriorly of, the filter cloth and deflect or depress it only slightly. The winding 40 which is wound into the grooves 38 embraces the rods 36 and positively holds them in position while the notches 38 space the windings and prevent material displacement.

The embodiment disclosed in Figures 5–8 is similar to and bears the same reference numerals as the previously described embodiment, except in the following respects. Instead of the caulking groove previously described, each division strip is provided with a longitudinally extended recess 41 of cylindrical cross section, each carrying coaxially therein a rotatable spindle 42, longitudinally slotted as at 43. Each spindle is mounted for rotation in bushings, not shown, located in the respective longitudinal extremities of the drum with provision for rotating or tightening each spindle and locking it in the desired rotational position. For example, in Figure 6, one longitudinal extremity of each spindle extends beyond the end of the drum and is provided with a ratchet 44 which is normally engaged by a spring pressed pawl 46 mounted on the head of the drum. Polygonal head 48 attached to the ratchet 44 serves to receive a wrench or crank.

Therefore, in the process of assembly, starting with division strip A, the extremity of the attached flap 26 is inserted through the respective slot 43 and the spindle rotated to wind the flap and draw the filter blanket into the position shown. At the succeeding division strips the process is respectively repeated, the peripheral extremities of this blanket being ultimately attached at division strip C as indicated.

In this embodiment, as indicated, it is preferable to employ, in connection with the drum winding, spacing rods 50 having concave arcuate interior surfaces mating with the surface of the spindle 42. The drum winding 40 is applied as previously within notches or grooves 38 in the spacing rods 50.

As has been intimated, the present invention overcomes filter blanket failure occasioned by reliance upon fabric gripping and clamping to retain the filter cloth in position. Such previous methods of attachment manifestly limit filter cloths to those fabrics capable of being abrasively clamped, bent at a sharp angle and subjected to extreme localized stresses. Glass and metal fabrics, while possessing advantageous properties from the standpoint of filtration properties, cannot be used successfully by this means.

In contrast, the present invention obviates such limitations upon the use of desirable materials, since the attachment flap or apron may comprise any flexible material selected exclusively for its tensile properties. For example, the present invention contemplates the use of fiber glass cloth or metal fabric filter blankets, the attaching flaps or aprons secured thereto being composed of flexible plastic, high strength duck, or other materials having a high resistance to distortion and abrasion, such as leather, chamois, etc. While, as previously mentioned, the attachment flaps may be sewed to the main filter blanket, brazing or soldering may be obviously practiced in the case of metal fabrics, or the attachment may be woven into the fabric of the main blanket.

It is to be noted, also, that the total dead filter area is materially decreased by the present arrangement, since substantially the entire peripheral surface of the blanket constitutes effective filter area. This is in contrast with the usual practice, where the amount of filter drum surface rendered ineffective by caulking may amount to as much as 5% of the total peripheral area.

Obviously many modifications and variations of the invention as herein set forth may be made without departing from the spirit and scope thereof, therefore, only such limitations should be imposed as are indicated in the appended claims.

We claim:

1. In a drum type continuous sectional filter wherein the filter sections are separated by annularly spaced, longitudinally extending, division strips at the periphery of the cylindrical drum, the improvement which comprises a filter cloth extending about the surface of the drum, and embracing a plurality of said filter sections, a projecting flap of flexible sheet material attached to and projecting from the inner surface of said filter cloth in the vicinity of each division strip and means associated with each division strip to grip said respective flap and hold the filter cloth in operative position.

2. A drum type continuous filter as defined in claim 1 wherein each said flap engages within a caulking groove in said division strips and is held in place by a malleable caulking material driven into said groove.

3. A drum type, continuous filter as defined in claim 1 wherein each division strip is provided with a recess containing a longitudinal spindle, and means associated with each spindle for engaging each said attaching flap to hold the filter cloth in operative position.

4. In a drum type sectional continuous rotary filter the cylindrical drum surface of which is divided into filter sections by means of longitudinally extending, annularly spaced, division strips, a filter cloth extending about the cylindrical surface of said filter outwardly of said division strips, a flap attached to and secured to the inner surface of said filter cloth in the vicinity of each division strip, said flaps being engaged with the respective division strips to retain the filter cloth in operative position and being made of substantially the same material as said filter cloth.

5. A drum type, sectional, continuous rotary filter as defined in claim 4 wherein each flap is secured to the said inner surface of the filter cloth adjacent one longitudinal margin thereof and wherein each division strip is provided with means for engaging the respective attachment flap, thereby securing the filter cloth in operative position upon the drum.

6. A filter drum according to claim 5 wherein said means for engaging the attachment flap comprises a spindle provided with means to receive said flap, means to rotate said spindle to tension said flap with respect to the division strip, and means to hold the spindle in adjusted rotational position.

7. In the application of a filter cloth to the cylindrical surface of a rotary, drum type, continuous, sectional filter, the sections of which are defined by a plurality of longitudinally extending, annularly spaced, division strips, the steps which comprise placing about the filter drum, in circumferentially embracing position, a filter cloth capable of covering a plurality of filter sections said filter cloth having attached to its inner surface a plurality of circumferentially spaced longitudinally extending flaps, and fastening the underside of said filter cloth to said filter drum by successively attaching each flap to its adjacent division strip thereby holding the cloth in operative position with respect to said filter drum.

8. In a drum type continuous rotary filter wherein the filter sections are separated by peripherally spaced, longitudinally extending division strips comprising means for attachment of a filter cloth, the improvement which comprises a filter cloth extending about the surface of the drum in a substantially uninterrupted peripheral path, said filter cloth having a plurality of longitudinally extending, projecting flaps of flexible sheet material integrally attached to and secured to the inner surface thereof in the vicinity of each division strip, each of said flaps being connected with the respective division strip by said attachment means to hold the filter cloth in operative position upon the drum, said flaps being made of the same material as said filter cloth.

References Cited in the file of this patent

UNITED STATES PATENTS

| | | |
|---|---|---|
| 1,348,036 | Mount | July 27, 1920 |
| 2,018,398 | Denhard | Oct. 22, 1935 |
| 2,134,703 | Cobb | Nov. 1, 1938 |
| 2,259,235 | Weiss | Oct. 14, 1941 |
| 2,454,134 | Burleson | Nov. 16, 1948 |
| 2,534,161 | Collins | Dec. 12, 1950 |
| 2,548,999 | Oliver | Apr. 17, 1951 |
| 2,582,273 | Peterson et al. | Jan. 15, 1952 |

FOREIGN PATENTS

| | | |
|---|---|---|
| 379,053 | Great Britain | Aug. 25, 1932 |